March 23, 1926.

H. K. SANDELL

DYNAMO ELECTRIC MACHINE

Filed June 10, 1925

1,578,097

Inventor,
Henry K. Sandell,
By Dyrenforth, Lee, Chritton and Wiles,
Attys.

Patented Mar. 23, 1926.

1,578,097

UNITED STATES PATENT OFFICE.

HENRY K. SANDELL, OF CHICAGO, ILLINOIS.

DYNAMO-ELECTRIC MACHINE.

Application filed June 10, 1925. Serial No. 36,151.

*To all whom it may concern:*

Be it known that I, HENRY K. SANDELL, a citizen of the United States, residing at Chicago, in the county of Cook and State of Illinois, have invented a new and useful Improvement in Dynamo-Electric Machines, of which the following is a specification.

This invention relates to dynamo-electric machines and the like.

The primary object is to provide an efficient means for producing a combination of motive power and a generated current, the voltage of the generated current being preferably different from that of the impressed electro-motive force.

The invention is fully described in the following specification and shown in the accompanying drawings in which.

Figures 1, 2:
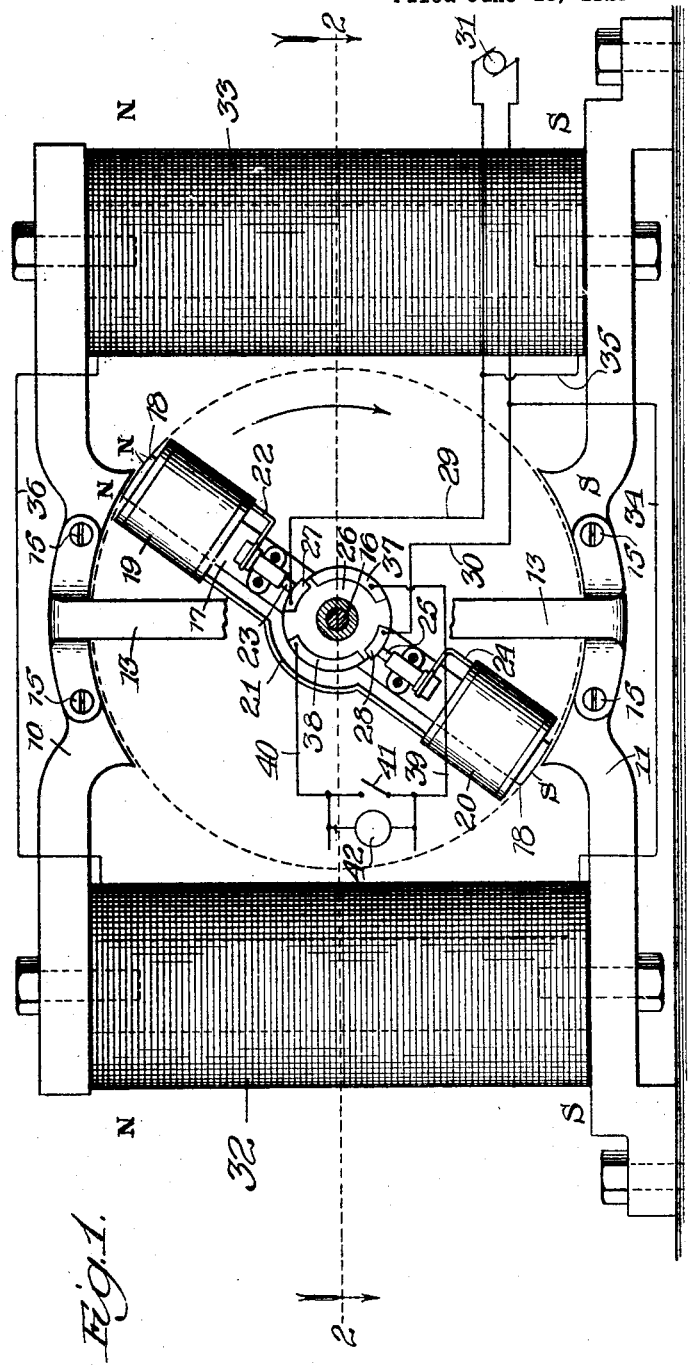
Figure 1 is an end elevation of a machine embodying the invention.
Fig. 2 is a horizontal section on the line 2—2 of Fig. 1.

The machine as illustrated consists of top and bottom pole pieces 10 and 11 which are secured together at their ends by means of field cores 12, both of which have their north poles pointing in the same direction as shown in Fig. 1. The pole pieces 10 and 11 which are of a suitable magnetic material such as cast iron are connected near their middle by means of brackets 13 and 14 which are secured thereon by means of screws 15.

A shaft 16 is journaled in suitable bearings in the brackets 13 and 14 and has keyed thereto a bar magnet 17 made up of a number of laminated sections. The center of these laminations are left soft while the outer ends 18 are hardened so as to give them momentarily the effect of a permanent magnet.

Electric magnet coils 19 and 20 are secured upon the outer ends of the rotating bar magnet 17, two ends of these coils are connected together by means of a lead 21. The other end of the coil 19 is connected by means of a lead 22 to a brush 23 while the other end of the coil 20 connects by means of a lead 24 with a brush 25. These brushes are carried by the bar magnet 17 and are pressed inwardly by means of springs (not shown) so as to be held lightly in contact with the commutator 26 which is secured to the bracket 13.

The block 26 is made of an electric insulating material in which is secured two metallic segments 27 and 28. These segments are connected through leads 29 and 30 with a suitable source of electric energy as the generator 31.

As the shaft 16 revolves in a clockwise direction as indicated in Fig. 1, the brushes 23 and 25 come into contact with the segments 27 and 28 and current flows from the generator 31 and into the electric magnet coils 19 and 20 reversing the polarity of the bar magnet 17 so that at the instant shown in Fig. 1, the upper end of the bar magnet becomes a north pole while the lower end is a south pole. It will be observed that the north pole of the rotating magnet is then opposite the north pole of the pole piece 10 and likewise the south pole of the rotating magnet is opposite the south pole piece 11, so that the north pole of the rotating bar magnet will be repelled by the north pole of the fixed pole piece, and the south pole will also be repelled by the pole piece 11 for the same reason, and each end of the rotating bar magnet will be attracted by the opposite pole piece so that the shaft 16 will tend to keep on revolving in the same direction.

The width of the segments 27 and 28 is such as to give current from the generator 31 time to cause a complete reversal of magnetism of the tempered outer end of the rotating bar magnet. The field coils 32 and 33 are energized in any well known manner as by means of current from the generator 31 to which they are connected by leads 34 and 35 and the connecting lead 36.

Immediately after the brushes 23 and 25 pass the segments 27 and 28 they encounter much longer metal segments 37 and 38 which are electrically connected by means of leads 39 and 40 which may be closed through a switch 41. Collapse of the lines of force within the electric magnet coils 19 and 20 due to breaking contact between the segments 27 and 28 and the brushes 23 and 25 tends to cause a continuance of flow of current through the coils 19 and 20 in the same direction due to the natural drop in magnetization in the bar magnet. The segments 37 and 38 being connected together and coming in contact with the brushes 23 and 25 permit this action to take place for a short period of time, thereby further maintaining the magnetization of the rotating bar magnet near its maximum for a considerable portion of its swing.

As the brushes 23 and 25 are revolved and are brought into contact with the segments 28 and 27 respectively, the direction of flow of current through the coils 19 and 20 is reversed, thereby again reversing the polarity of the bar magnet 17 when the cycle of operation just described is repeated.

The commutator is preferably raised at the points having the segments 27 and 28, the initial ends of the segments 37 and 38 being slightly depressed as shown in Fig. 1.

The potential difference produced by the natural drop in magnetization of the magnet coils is further utilized by connecting lamps 42 or other suitable current operated devices across the terminals 39, 40. By opening the switch 41, current flows through the lamps or the like 42, thus doing useful work and utilizing the energy generated due to this natural drop in magnetization.

While I have shown and described certain embodiments of my invention, it is to be understood that it is capable of many modifications. Changes therefore in the construction and arrangement may be made without departing from the spirit and scope of the invention as disclosed in the appended claims.

I claim:

1. In a dynamo-electric machine, an armature having prongs, a separate winding on each prong, means for energizing said windings to produce motive power, means for de-energizing said windings and means for utilizing the induced current produced in said windings by the natural drop in magnetization after each energization.

2. The dynamo-electric machine according to preceding claim 1 characterized by said armature being a bar magnet composed of laminations.

3. In a dynamo-electric machine, an armature having prongs, a separate winding on each prong, means for energizing said windings to produce motive power, means for de-energizing said windings and means for utilizing outside said machine the induced current produced by the natural drop in magnetization after each energization.

4. A dynamo-electric machine comprising two pole pieces of opposite polarity, a magnet momentarily having a polarity and rotatable in front of said pole pieces, electromagnetic coils on the ends of said magnet, means for reversing the direction of flow of current in said coils as the magnet passes from one pole piece to the next, and means for utilizing the current produced in said coils by the natural drop in magnetization in said magnet for doing work outside of said machine.

5. A dynamo-electric machine comprising two pole pieces of opposite polarity, a magnet momentarily having a fixed polarity rotatable in front of said pole pieces, electromagnetic coils on the ends of said magnet, means for reversing the direction of flow of current in said coils as the magnet passes from one pole piece to the next, and means electrically connected to the ends of said coils for utilizing the current produced in said coils due to the natural drop in magnetization therein.

6. A dynamo-electric machine comprising two pole pieces of opposite polarity, a magnet momentarily having a fixed polarity and rotatable in front of said pole pieces, electromagnetic coils on the ends of said magnet, an end of one coil being connected to an end of the other coil, a brush connected to the free end of each coil and rotatable therewith, a stationary commutator having segments connected to a source of electric current for reversing the polarity of said magnet, second segments carried by said commutator operable on said brushes after said brushes have moved out of contact with said first mentioned segments, and means connected to said second segments for utilizing outside said machine the current generated by the drop in magnetization in said coils.

In testimony whereof I have hereunto set my hand this 1st day of June, 1925.

HENRY K. SANDELL.